United States Patent [19]

Angstadt

[11] Patent Number: 4,682,653

[45] Date of Patent: Jul. 28, 1987

[54] STEAM RECOVERY PROCESSES EMPLOYING STABLE FORMS OF ALKYLAROMATIC SULFONATES

[75] Inventor: Howard P. Angstadt, Media, Pa.

[73] Assignee: Sun Refining and Marketing Company, Philadelphia, Pa.

[21] Appl. No.: 832,185

[22] Filed: Feb. 24, 1986

Related U.S. Application Data

[63] Continuation-in-part of Ser. No. 782,158, Oct. 2, 1985, abandoned, which is a continuation of Ser. No. 596,476, Apr. 3, 1984, abandoned.

[51] Int. Cl.$^4$ ...................... E21B 43/22; E21B 43/24
[52] U.S. Cl. ................................... 166/303; 252/8.554
[58] Field of Search ................................ 166/272, 303; 252/8.55 D, 8.554

[56] References Cited

U.S. PATENT DOCUMENTS

| | | | |
|---|---|---|---|
| 3,135,326 | 6/1964 | Santee | 166/272 |
| 3,292,702 | 12/1966 | Boberg | 166/303 |
| 3,302,713 | 2/1967 | Ahearn | 166/272 X |
| 3,357,487 | 12/1967 | Gilchrist et al. | 166/272 X |
| 3,402,770 | 9/1968 | Messenger | 166/272 X |
| 3,648,771 | 3/1972 | Kelly et al. | 166/272 |
| 3,994,342 | 11/1976 | Healy et al. | 166/275 X |
| 4,295,980 | 10/1981 | Motz | 166/275 X |
| 4,458,759 | 7/1984 | Issaacs et al. | 166/272 |

*Primary Examiner*—George A. Suchfield
*Attorney, Agent, or Firm*—J. Edward Hess; Donald R. Johnson; Stanford M. Back

[57] ABSTRACT

Alkylaromatic sulfonates, and particularly dialkylaromatic sulfonates, useful as surfactants in steam recovery methods for enhancing oil recovery from subterranean formations, have been found to comprise mixtures of meta- and para-isomers of the same obtained by alkylating alkylaromatics, where the alkyl group has from 1 to 4 carbon atoms, with a $C_{14-30}$ olefin. It has been found that when the ratio of para-isomer to meta-isomer is increased in this mixture, a significantly more hydrolytically, thermally stable surfactant under steam recovery operating conditions is obtained.

5 Claims, No Drawings

STEAM RECOVERY PROCESSES EMPLOYING STABLE FORMS OF ALKYLAROMATIC SULFONATES

CROSS-REFERENCE TO RELATED CASES

This application is a continuation-in-part of U.S. Ser. No. 782,158 filed Oct. 2, 1985, now abandoned, which in turn is a continuation of U.S. Serial No. 596,476, filed April 3, 1984, now abandoned.

BACKGROUND OF THE INVENTION

1. Field of the Invention

This invention relates to improved surfactants useful in the recovery of oil, and to methods employing the same. More particularly, it relates to hydrolytically stable forms of alkylaromatic sulfonates which may be used with steam in enhancing recovery of subterranean oil.

2. Description of the Prior Art

The use of aqueous flooding techniques, with or without the addition of various reagents such as surfactants, water thickeners and the like to recover crude oil left behind in formations after the "primary" oil has been withdrawn is well established in the art. These displacement methods have been improved by the aforesaid surfactants and the like in both secondary and tertiary processes, as where a formation has already been water-flooded at least once.

Representative of the prior art compositions and methods described above are those taught in U.S. Pat. Nos. 3,348,611 to Reisburg; 3,885,626 to Gale et al; 3,901,317 to Plummer et al; 3,994,342 to Healy et al; and 4,295,980 to Motz, all of which teach aqueous flooding techniques with at least one surfactant, and in some cases, with viscosity modifiers, co-surfactants or the like. Amongst the more preferred surfactants employed have been the alkyl aryl sulfonates, and particularly the dialkyl aryl sulfonates such as those derived from the alkylation of toluene, ethylbenzene, and the like.

In addition to the aforedescribed aqueous flooding techniques, the art has also employed steam, principally for tertiary oil recovery, utilizing the effect of heat to obtain heavy oil from the formations in which it is found. See, for example, U.S. Pat. Nos. 3,357,487 and 3,994,345.

The mechanism and effects of surfactants under these high temperatures and diverse formation conditions remain unclear, and thus make it impossible to predict from a knowledge of the effects of aqueous surfactant systems which surfactants, if any, can advantageously be employed in these steam recovery conditions. However, it is known that over a period of time these sulfonated surfactants do become deactivated as a result of the loss of their sulfonate groups because of the high temperatures and other operating conditions of the steam recovery methods. It is, therefore, an object of this invention to provide alkylaromatic surfactants, and particularly dialkylaromatic sulfonates, which are more stable under the operating conditions of steam recovery methods than those of the prior art.

These and further objects and advantages of the methods of the present invention will become apparent in the course of the following detailed description thereof.

SUMMARY OF THE INVENTION

In accordance with the present invention it has been found that alkylaromatic sulfonates, and particularly dialkylaromatic sulfonates, obtained by conventional alkylation and sulfonation processes which are well known in the art actually comprise mixtures of meta- and para-isomers of said compounds, and that surprisingly, when the amount of the paraisomers in the mixture is increased, relative to the meta-isomer, a significantly more hydrolytically stable sulfonate composition is obtained which is resistant to deactivation over longer periods of time under steam recovery conditions.

These improved sulfonate compositions may be used alone or in combination with co-surfactants, viscosity modifiers, hydrotropes or other additives known to those skilled in the art.

DESCRIPTION OF THE PREFERRED EMBODIMENTS

The dialkylaromatic sulfonates of the prior art are conventionally prepared, as stated above, by first alkylating an alkylaromatic compound such as toluene or ethylbenzene, with a long chain olefin or mixture of such olefins in the presence of an alkylating catalyst. This reaction, it is now known, actually provides a mixture of meta- and para-isomers of the resulting dialkylaromatic compound in which the amount of meta-isomer normally exceeds that of the para-isomer. This mixture is then sulfonated to provide the desired surfactant composition.

Since it is now recognized for the first time, in accordance with this invention, that by changing the ratios of these isomers to increase the amount of para-isomer relative to the meta-isomer there is obtained a more stable form of surfactant composition to be used in steam recovery methods, it will be recognized that this desired result may be achieved either by alkylation methods which selectively increase the amount of para-isomer, or by adding concentrated or pure para-isomer to an alkylate obtained by conventional means, or else by reducing the amount of meta-isomer.

In terms of percentages of the respective isomers in the alkylate mixture, it has been found that conventional alkylates prepared by reacting a long-chain olefin with an alkylaromatic starting material, e.g., in the presence of HF or $AlCl_3$ at elevated temperatures, generally contain about 35 to 40% of the para-isomer and 60 to 65% of the metaisomer, by weight. When this amount of para-isomer is increased by at least about 5–10 percent, i.e., to at least about 45 weight percent of the total isomer mixture, and desirably as much as feasible up to, ideally, 100 percent, the effective lifetime of the resulting sulfonate is significantly increased under steam recovery operating conditions, thereby providing increased oil recovery at lower cost.

Amongst the alkylaromatic compounds which may be employed in the methods and composition of this invention are most preferably the dialkylaromatics wherein one alkyl group contains 1 to about 4 carbon atoms, and the other is a longer chain moiety containing up to about 30 carbon atoms. These dialkyl compounds are generally obtained by the alkylation of such lower alkyl aromatics as toluene, ethylbenzene, cumene and the like with, for example, an olefin, as described below, in the presence of HF or $AlCl_3$ at elevated temperatures, e.g., at about 25°–100° C.

The long chain alkyl moiety of the resulting dialkylaromatic sulfonate, (which may be branched or straight-chain) should desirably have from about 12 to 30 carbon atoms, and preferably an average of about 14 to 18 carbon atoms, and most preferably about 16 carbon atoms. The term "average" is thus meant to signify that mixtures of hydrocarbons may be employed wherein the weighted average is about 16 carbon atoms even though shorter or longer chain lengths may be present.

Alternatively, pure olefins in this range may also be employed. Thus, in one embodiment of the invention, the alkyl moiety may be derived from a mixed $C_{14-18}$-olefin source in which the molecular weight distribution is such that the resultant alkylate side chain has 16 carbon atoms, even though lesser amounts of somewhat shorter or longer chain lengths may be present.

One preferred alkylate, having an average number of carbon atoms of about 16.2, may be derived from a wax-cracked $C_{14-18}$-olefin, and has the following weight distribution:

| Carbon Atoms in Side Chain | Weight Distribution (%) |
|---|---|
| $C_{14}$ | 2 |
| $C_{15}$ | 30 |
| $C_{16}$ | 30 |
| $C_{17}$ | 28 |
| $C_{18}$ | 10 |

Alternatively, the olefin may be a $C_{14-18}$ mixture derived from the the polymerization of ethylene in a known manner, wherein the average alkyl group is 16, and wherein the mixture is further characterized by alkyl groups having even-numbered carbon atoms only. A typical weight distribution of such a mixture is as follows:

| Carbon Atoms in Side Chain | Weight Distribution (%) |
|---|---|
| $C_{14}$ | 25 |
| $C_{16}$ | 50 |
| $C_{18}$ | 25 |

Conventional alkylation methods leading to a mixture of dialkylaromatic isomers, generally in the ratio of about 40:60 of para:meta, are well-known in the art as described above. However, one method for accomplishing the objectives of this invention, i.e., increasing the ratio of para- to meta-isomer in the alkylate, is to modify the operating temperatures in, for example, a conventional HF alkylation process. Thus, when the temperature of a known HF alkylation process is reduced from about 25°–35° C. and above to below 25° C. down to about 0° C, there is obtained in the product mixture a ratio of about 70:30 by weight of para:meta isomers. Other methods, such as alkylation using titanium tetrachloride are also known in the art for increasing the ratio of the para-isomer, as for example the procedure of N. M. Cullinane et al., described in *J. Chem. Soc.*, 1954, at page 2942. Also, as stated above, if desired, this ratio can be increased by simply adding more para-isomer to the alkylate, or less desirably, separating and removing as much of the meta-isomer from a conventional alkylate as is feasible.

After the desired ratio of para- to meta-isomer is obtained, the alkylate may then be sulfonated by methods well-known in the art, and the resulting more highly stable form of alkylaromatic sulfonate used in the process of this invention.

The unexpected superior hydrolytic stability of the para-isomer of dialkylsulfonates is illustrated by the data in Example 1.

EXAMPLE 1

Two alkylaromatic sulfonate decomposition reactions were carried out, as described below, in a 300-ml Parr stainless steel reactor equipped with a sampling tube, pressure relief valve, pressure gauge and thermowell. The reactor was heated via an external proportionating heater, and samples were withdrawn through a coiled ⅛-inch stainless steel tube immersed in an ice-bath, thereby providing only condensed samples. This system was purged between samples. The reactor was charged with 200–220 mls of about a 1 wt. % aqueous surfactant solution and the entire system swept with nitrogen. The sulfonate solutions were prepared in deionized water; samples were analyzed in triplicate for surfactant by HPLC.

Following the above procedure, the rate of desulfonation of p-2hexadecyl toluene sulfonate (1.13 wt. % soln.) was compared with that of m-2-hexadecyl toluene sulfonate (0.759 wt. % soln.) at 299° C and buffered at pH-4. The following results were obtained showing wt. % of remaining active sulfonated surfactant after given periods of time.

TABLE 1

| m-2-Hexadecyl toluene sulfonate | | p-2-Hexadecyl toluene sulfonate | |
|---|---|---|---|
| Time (hrs.) | Active Mtrl. (wt. %) | Time (hrs.) | Active Mtrl. (wt. %) |
| 0 | 0.759 | 0 | 1.13 |
| 1 | 0.707 | 1 | 1.14 |
| 10.05 | 0.517 | 3.0 | 1.02 |
| 35.50 | 0.440 | 5.0 | 0.98 |
| 59.33 | 0.310 | 84.5 | 1.13 |
| 65.36 | 0.211 | 133.9 | 1.11 |
| | | 156.8 | 1.09 |
| | | 280.3 | 1.05 |

Thus, it is seen that the para-isomer possesses greater stability against desulfonation than does the meta-isomer at elevated temperatures found under steam recovery conditions.

EXAMPLE 2

A $C_{14-18}$ alkyltoluene sulfonate, wherein the alkyl group had an average of about 16 carbon atoms and in which the orientation of the alkyl groups was, by weight, 60% meta-isomer and 40% para-isomer, was subjected to the desulfonation conditions described in the previous example. After 42 hours, the reaction was stopped and the hydrocarbon layer arising from the desulfonation reaction was isolated and analyzed by capillary gas chromatography. This material was more than 90% of the meta-oriented alkyltoluene, thus demonstrating the rapid hydrolysis of the meta-dialkyl aromatic sulfonate isomer in a commercial mixture.

When a similar experiment is carried out using a mixture of dialkyl sulfonates having a greater than about 45% para-isomer composition, the time required to attain the same degree of hydrolysis is greater as the meta-isomer component is proportionately reduced, thereby allowing the surfactant greater lifetime in the reservoir, and resulting in better oil recoveries.

What I claim is:

1. A method for the recovery of oil from a subterranean reservoir which comprises injecting steam and a dialkylaromatic sulfonate surfactant into the reservoir, and producing oil displaced by said surfactant and steam, said surfactant being comprised of a mixture of para- and meta-isomers of said dialkylaromatic sulfonate, wherein the amount by weight of the para-isomer in the mixture has been increased relative to the amount of meta-isomer sufficient to provide an increase in the hydrolytic stability of said mixture.

2. The method of claim 1 wherein one of said alkyl groups of the dialkylaromatic sulfonate contains from 1 to about 4 carbon atoms, and the other alkyl group contains from about 12 to 30 carbon atoms.

3. The method of claim 1 wherein the dialkylaromatic sulfonate is an alkyl toluene sulfonate, said alkyl group having an average of about 16 carbon atoms.

4. The method of claim 1 wherein the weight percent of para-isomer of dialkylaromatic sulfonate in the increased mixture is at least about 45 percent of the total para- and meta-isomer mixture.

5. The method of claim 1 wherein the surfactant is accompanied by a cosurfactant, a viscosity modifier, a hydrotrope, or mixtures of the same.

* * * * *